(12) United States Patent
Vanderhye (10) Patent No.: US 7,381,030 B1
(45) Date of Patent: Jun. 3, 2008

(54) WIND TURBINE SHROUD

(76) Inventor: Robert A. Vanderhye, 801 Ridge Dr., McLean, VA (US) 22101-1625

( * ) Notice: Subject to any disclaimer, the term of this patent is extended or adjusted under 35 U.S.C. 154(b) by 420 days.

(21) Appl. No.: 11/137,567

(22) Filed: May 26, 2005

Related U.S. Application Data (60) Provisional application No. 60/592,140, filed on Jul. 30, 2004, provisional application No. 60/643,109, filed on Jan. 12, 2005.

(51) Int. Cl.
*F03D 9/00* (2006.01)
(52) U.S. Cl. .............................. 416/146 R; 416/169 R
(58) Field of Classification Search ................ 415/123, 415/126; 416/146 R, 169 R, 179, 223 R
See application file for complete search history.

(56) References Cited

U.S. PATENT DOCUMENTS

| | | | |
|---|---|---|---|
| 1,650,702 A | | 11/1927 | Folmer |
| 2,007,963 A | * | 7/1935 | Cleveland ............... 416/169 R |
| 2,742,097 A | | 4/1956 | Gaston |
| 4,287,816 A | * | 9/1981 | Riccard ......................... 454/4 |
| 4,347,039 A | | 8/1982 | Houghton |
| 4,830,570 A | | 5/1989 | Benesh |
| 4,964,822 A | | 10/1990 | Mueller |
| 5,506,453 A | | 4/1996 | McCombs |
| 6,172,429 B1 | | 1/2001 | Russell |
| 6,261,138 B1 | | 7/2001 | Imura |
| 6,916,217 B1 | * | 7/2005 | Crepeau ....................... 440/71 |

FOREIGN PATENT DOCUMENTS

| | | |
|---|---|---|
| JP | 58187587 | 11/1983 |
| JP | 9287549 | 11/1997 |
| JP | 11294313 | 10/1999 |

OTHER PUBLICATIONS

"New Rotor Ship Sails In Lightest Winds", Popular Science, Jul. 1933.
"The Boat Barn Web Page", www.atomic.net/~gklimber/jrwindm.htm (date unknown, printed Jun. 4, 2004).
"Winding Upward with Corks and Turbines", Rensselaer Eng., www.eng.rpi.edu/soenews/update.do?skinName=print; Sep. 20, 2003.

* cited by examiner

*Primary Examiner*—Edward K. Look
*Assistant Examiner*—Devin Hanan (57) ABSTRACT

A vertical axis wind turbine assembly, such as a Savonius, typically mounted on a watercraft, utilizes a number of different shroud configurations to substantially preclude rotation when docked. Collapsible "curtains" mounted above the wind engaging elements, pre-defined shape or inflatable bladder inserts for convex volumes of the turbine rotor, pull over sheet material covers for the convex volumes, and a wrap-around flexible sheet, each may be utilized as shrouds. A human or wind powered boat is provided with an adjustable pitch propeller which includes cams mounted on propeller blades and movable by an operator-controlled sleeve to the desired position for a positive or negative pitch. The wind turbine may comprise rotor stages of different hand, rotating in opposite directions, and having substantially concentric shafts operatively connected to oppositely rotating propellers, for driving the boat forward.

20 Claims, 10 Drawing Sheets

FIGURE 12

WIND TURBINE SHROUD

CROSS-REFERENCE TO RELATED APPLICATION

This application is based upon and claims the priority of U.S. Provisional Applications 60/592,140 filed Jul. 30, 2004 and 60/643,109 filed Jan. 12, 2005, the disclosures of which are hereby incorporated by reference herein.

SUMMARY OF THE INVENTION

This application also incorporates by reference U.S. patent application Ser. Nos. 10/443,954 filed May 23, 2003 and 10/854,280 filed May 27, 2004. It relates primarily to a wind powered boat having particular shroud and propeller configurations, and also to a vertical axis wind turbine (VAWT) per se though particularly desirable for use in a wind powered boat.

The first aspect of the present invention relates to a shroud for a vertical axis wind turbine to substantially preclude wind from acting on the wind turbine by substantially covering the operable components thereof. U.S. patent application Ser. No. 10/443,954 filed May 23, 2003 discloses, per se, a shroud that can be placed over a VAWT (such as, but not restricted to, one with a Savonius rotor) mounted on a multihull watercraft. The first aspect of the invention is a refinement of that general disclosure in which the shroud can be typically mounted with the wind turbine (either on a stationary structure supporting the top of the wind turbine, or rotating with the wind turbine where there is no stationary top support), and has several different embodiments.

In the first embodiment, the shroud can be released to fall much like a conventional window shade or curtain to substantially cover the operating elements (e.g. vanes) of the VWAT. In a second embodiment inserts (which may be inflatable) are provided which change the aerodynamic configuration of the VAWT so that it will not rotate. In a third embodiment a shroud in the form of a flexible sheet on a roll is unrolled from or adjacent the shaft of the VAWT to be pulled over and cover the convex volume. In a fourth embodiment, the shroud is wrapped around the VAWT.

The various embodiments of shrouds according to the invention are primarily suitable for use with a multihull watercraft, but can be used with a land based VWAT, such as for generating electricity or operating a pump.

According to this first aspect of the invention there is provided a vertical axis wind turbine assembly having a shaft, a structure which mounts said shaft for rotation about a substantially vertical axis, and a plurality of wind engaging elements operatively mounted to the shaft which operatively engage wind and rotate said shaft in response thereto; and a shroud which collapses over the wind engaging elements, is inserted among the wind engaging elements, pulls over the wind engaging elements (covering a convex volume), or wraps around the wind engaging elements, so that when utilized substantially retards or prevents rotation of the shaft about its axis.

According to a first embodiment of this aspect, and a collapsible shroud is operatively mounted above at least some of the wind engaging elements and positioned so that, when in a collapsed position, substantially does not interfere with wind acting upon the wind engaging elements, or rotation of the shaft, but when moved from the collapsed position to a deployed position substantially blocks wind access to at least some of the wind engaging elements so as to substantially retard or prevent rotation of the shaft. The structure which mounts the shaft may include a stationary, with respect to the shaft, component mounted adjacent a top portion of the shaft, and the collapsible shroud may be operatively connected to the stationary top structure and the shroud does not rotate with the shaft.

Alternatively, the collapsible shroud is operatively connected to, and rotates with, the shaft.

Various mechanisms may be utilized for raising or collapsing the shroud, and for holding it in its various positions. Desirably, the VAWT with which the shroud is associated is mounted on a multihull wind powered boat, such as shown in copending application Ser. No. 10/443,954 filed May 23, 2003.

According to a second embodiment of this first aspect of the invention, the wind engaging elements include substantially convex portions (e.g. the VAWT is a Savonius) and inserts are provided for at least some of the convex portions to change the configuration thereof so that they no longer result in significant rotation of the shaft when the wind encounters them. The inserts may be of substantially predefined shape (such as Styrofoam or hollow plastic elements) which conform to the convex shape and change it into a flat or concave one. Alternatively the inserts may comprise at least one collapsible or deployable bladder operatively mounted adjacent at least some of the wind engaging elements and positioned so that, when in a collapsed position, substantially does not interfere with wind acting upon the wind engaging elements, or rotation of the shaft, but when moved from the collapsed position to a deployed position substantially blocks wind access to at least one substantially convex portion of a wind engaging element so as to substantially retard or prevent rotation of the shaft.

Where a bladder is utilized, it may be connected to a source of compressed gas which can inflate the bladder to deploy it. The source of compressed gas may be manually activated or automatically activated in response to excessive wind speed.

Again, the shroud is particularly suited for use with a VAWT on a multihull wind powered boat, but can be used elsewhere.

According to a third embodiment, a shroud in the form of a flexible sheet on a roll is unrolled from or adjacent the shaft of the VAWT to cover the convex volume. The sheet may be like a conventional window shade, is spring biased to the rolled condition, and is hooked or otherwise fastened in the operative position in which it covers the convex volume of a Savonius or like VAWT rotor.

According to a fourth embodiment of this aspect of the invention, the shroud is a wrap-around flexible sheet, e.g. of cloth or plastic. It can be attached to or adjacent tip portions of the wind engaging elements (e.g. spokes and/or vanes of a Savonius turbine, for example), and when the turbine rotates or is rotated, the sheet wraps around the wind engaging elements rendering them substantially inoperable, and the shroud is then fixed in place. Hoop and loop pile (e.g. VELCRO®) fasteners may be utilized to attach the sheet to the wind engaging elements, and one part of the sheet to others.

According to a second aspect of the present invention, there is provided an adjustable pitch propeller for a human or wind powered boat.

The variable pitch prop of U.S. Pat. No. 2,742,097 to Gaston (incorporated by reference herein) is close to acceptable but has some problems. In the patent (reference numerals are in the patent) the pitch of propeller blades 15 is changed by moving handle 21, which in turn moves Bowden cable 21 and causes the lever arm 32 to pivot. This in turn causes reciprocation of the sleeve 40 which has pins 60, 61 attached to it, and engages slots 47 in the blades 15. As the pins 60, 61 reciprocate along the dimension of the drive shaft 14 the blades 15 pivot about their axes perpendicular to the shaft 13 as defined by the threaded extensions 46 of blades 15. Pivoting about the axes changes the pitch. The sleeve 40 slides on the hub 38, not being fixed to it, but even though the patent doesn't say so, the sleeve 40 must also rotate with the hub 38 in view of the engagement between pins 60, 61 and slots 47, while the shaft drives the hub 38.

The invention would eliminate the drag likely caused by the arm arrangement (30) of the Gaston patent which may be acceptable in a motor powered prop boat, but not in a wind powered or human powered craft. Also, the particular Bowden cable arrangement of Gaston may not be durable enough where it is located and an additional bearing (53 in Gaston) is required. The invention is simpler and has less drag and more flexibility than the arrangement of Gaston.

That is according to this second aspect of the invention there is provided a human or wind powered boat having a variable pitch propeller, operable by an operator positioned in or on the boat. The propeller preferably has a pitch between negative and at least plus fifteen. Desirably, the propeller variable pitch is controlled by one or more cams operatively connected to propeller blades, and a reciprocal sleeve operatively engaging the cams. The propeller is particularly desirable with a multihull watercraft powered at least in part by a VAWT, such as a Savonius.

This aspect of the invention also encompasses a variable pitch propeller assembly per se comprising: a central drive shaft surrounded by a hub; a sleeve reciprocal on the hub; a plurality of blades each rotatably connected to the hub and having a cam; and a device which operatively biases the cams into contact with the sleeve so that reciprocation of the sleeve effects rotation of the blades with respect to the hub to change the pitch thereof.

According to a third aspect of the invention there is provided a Savonius or open helix VAWT which has at least two rotor stages designed to rotate in different directions (that is one clockwise, and the other counterclockwise). The rotor stages are mounted on concentric shafts, and operatively connected to driven devices, such as propellers or generators. Preferably the stages are operatively connected to propellers which in turn are mounted for rotation in opposite directions (e.g. similar to counter-rotating props on many conventional power boats), and the VAWT is mounted on a watercraft.

As used in the specification and claims the term "operatively" means—as it normally does—any relationship which causes components to function as desired. For example two components "operatively connected" are connected in any manner that allows them to function to obtain a desired result.

It is the primary object of the present invention to provide an enhanced wind turbine, wind powered boat, and components of a wind powered boat. This and other objects of the invention will become clear from a detailed description of the invention, and from the appended claims.

DETAILED DESCRIPTION OF THE DRAWINGS

Figure 3:
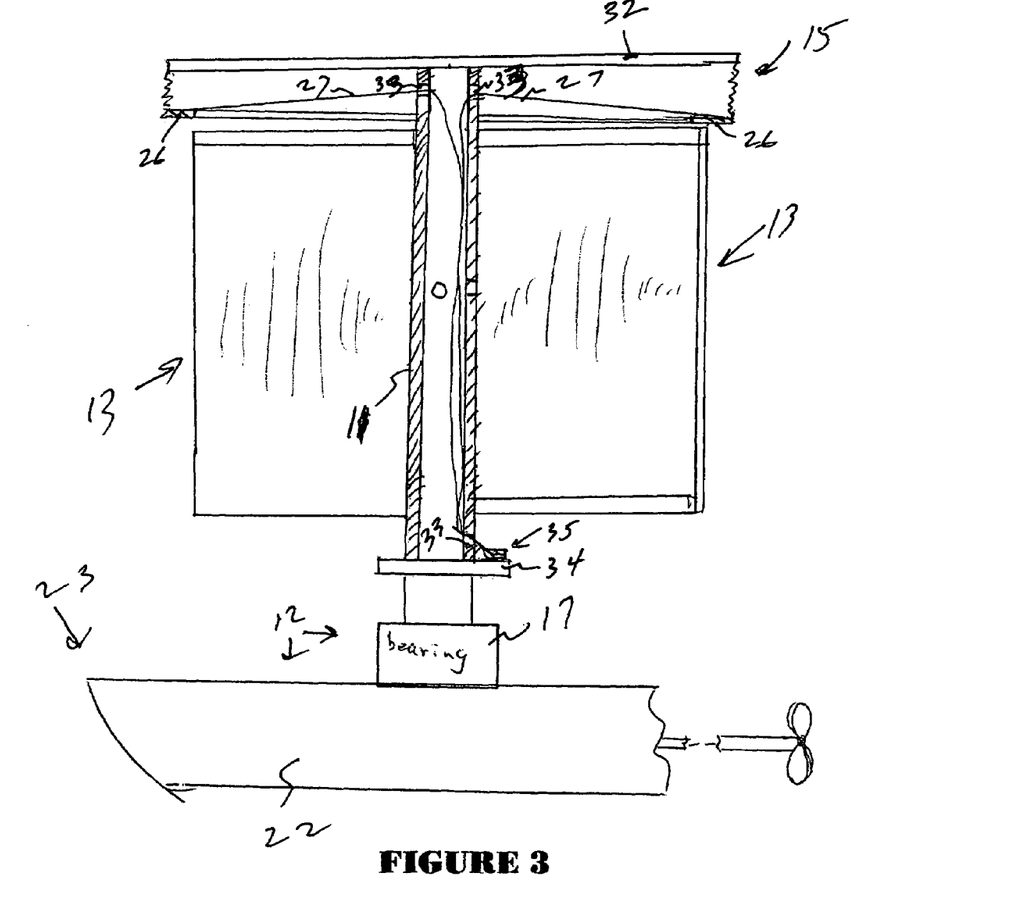
Figure 4:
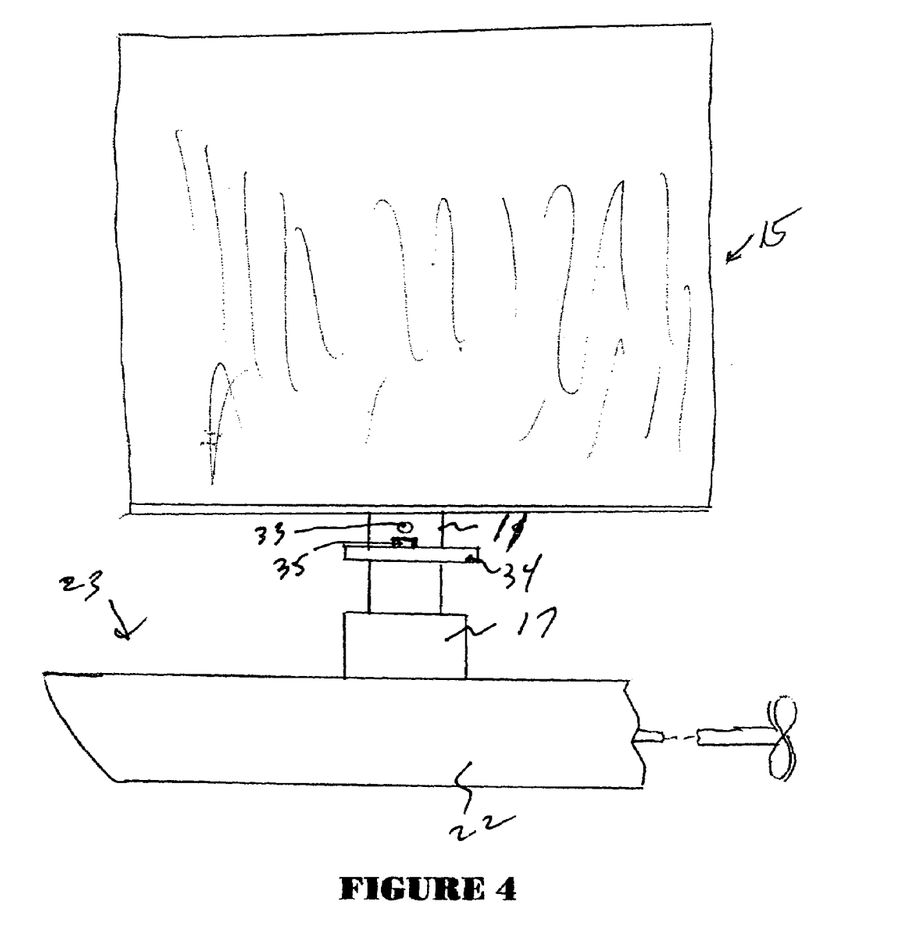
Figure 5:
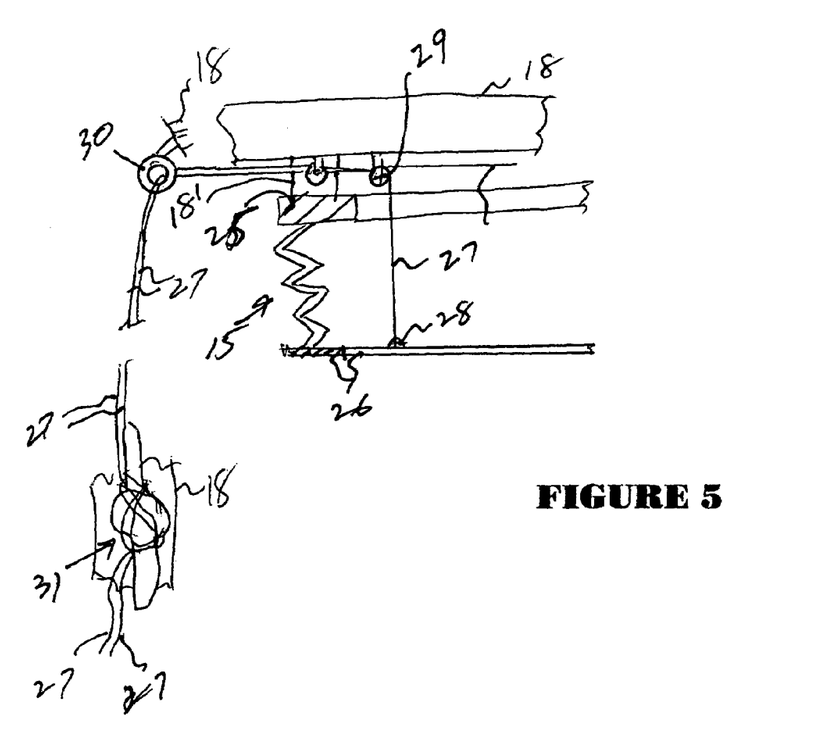
FIG. 5 is a schematic view of exemplary components used in the FIGS. 1 & 2 embodiment for holding the tubular shroud in collapsed position or releasing it to deployed position.
Figure 6:
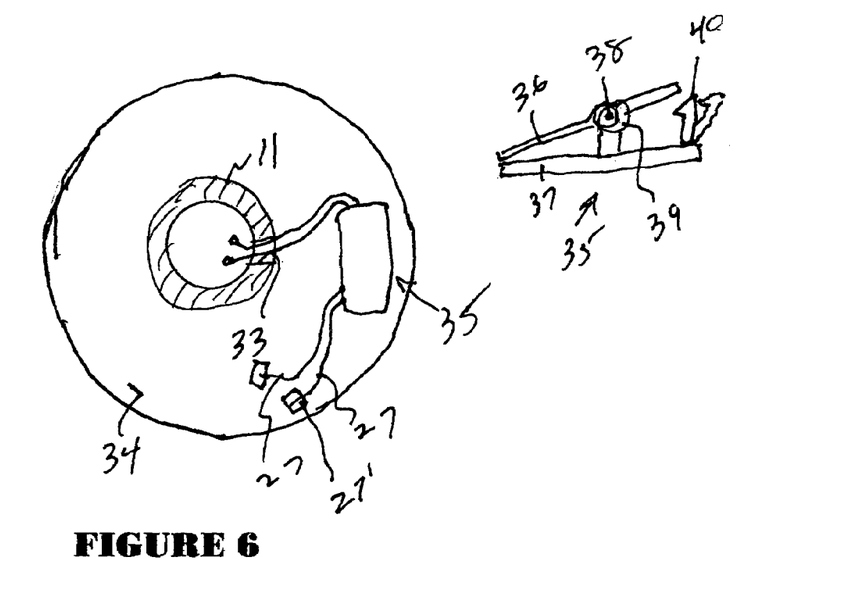
FIG. 6 is a top view of exemplary components used in the FIGS. 3 & 4 embodiment for holding the tubular shroud in collapsed position or releasing it to deployed position, as well as a side view of one of the components.

The first embodiment of a first aspect of the invention is illustrated in FIGS. 1-6, and those figures are only representation of the broad concept of the invention and are not indicative of the only manners in which the basic implementation of a collapsible shroud can be practiced. FIGS. 1-4 are side schematic views (FIGS. 1 & 3 partly in cross-section and partly in elevation) of two different versions of the first embodiment, FIG. 5 is a schematic view of exemplary components used in the FIGS. 1 & 2 version for holding the tubular shroud in collapsed position or releasing it to deployed position, and FIG. 6 is a top view of exemplary components used in the FIGS. 3 & 4 version for holding the tubular shroud in collapsed position or releasing it to deployed position, as well as a side view of one of the components.

As illustrated in FIGS. 1-4 of the drawings, there is provided a VAWT assembly, shown generally by reference numeral 10, having a shaft 11, a structure 12 which mounts the shaft 11 for rotation about a substantially vertical axis X-X, and a plurality of wind engaging elements 13 operatively mounted to the shaft 11 which operatively engage wind and rotate the shaft 11 in response thereto. While the elements 13 in these FIGURES are shown as comprising a Savonius rotor having vanes and spokes for supporting the vanes, other types of elements/rotors may be provided, including those disclosed in U.S. patent application Ser. No. 10/443,954 filed May 23, 2003. The vanes of elements 13 may be of relatively rigid material, such as sheet aluminum (e.g. 10-125 thousandths thick), or of relatively flexible material (e.g. modern sail cloth).

The VAWT assembly 10 also includes a collapsible shroud (substantially annular when collapsed and substantially tubular when deployed) shown generally at 15. The shroud 15 is operatively mounted above at least some of the wind engaging elements 13 of the VAVrr, and positioned so that—when in a collapsed position (FIGS. 1 and 3)—it substantially does not interfere with wind acting upon the wind engaging elements 13, or rotation of the shaft 11 about axis X-X. However when the shroud 15 is moved from the collapsed position to a deployed position (FIGS. 2 and 4) it substantially blocks wind access to at least some of the wind engaging elements 13 so as to substantially retard or prevent rotation of the shaft 11 about axis X-X.

Figure 1:
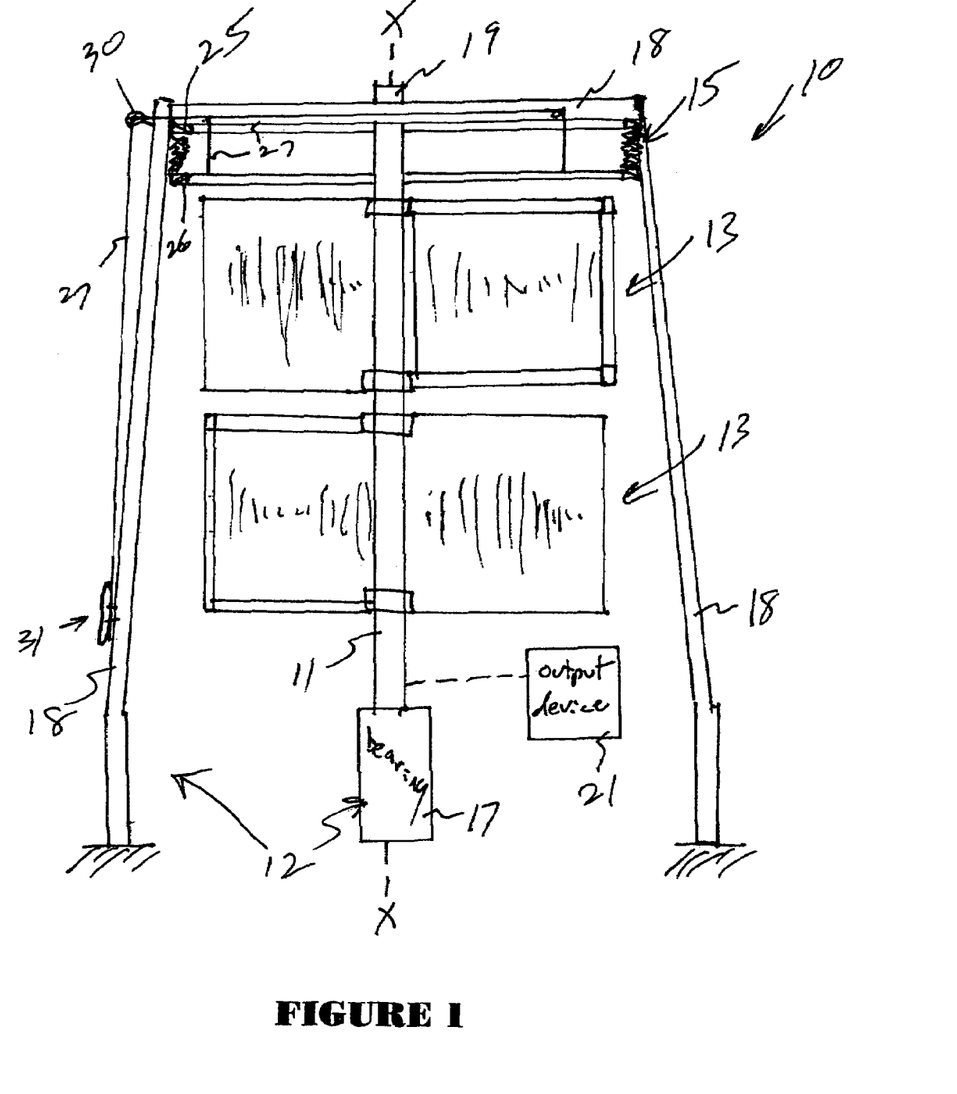
FIGS. 1-4 are side schematic views (FIGS. 1 & 3 partly in cross-section and partly in elevation) of two different versions of a first embodiment of a first aspect (shroud) of the invention.
Figure 2:
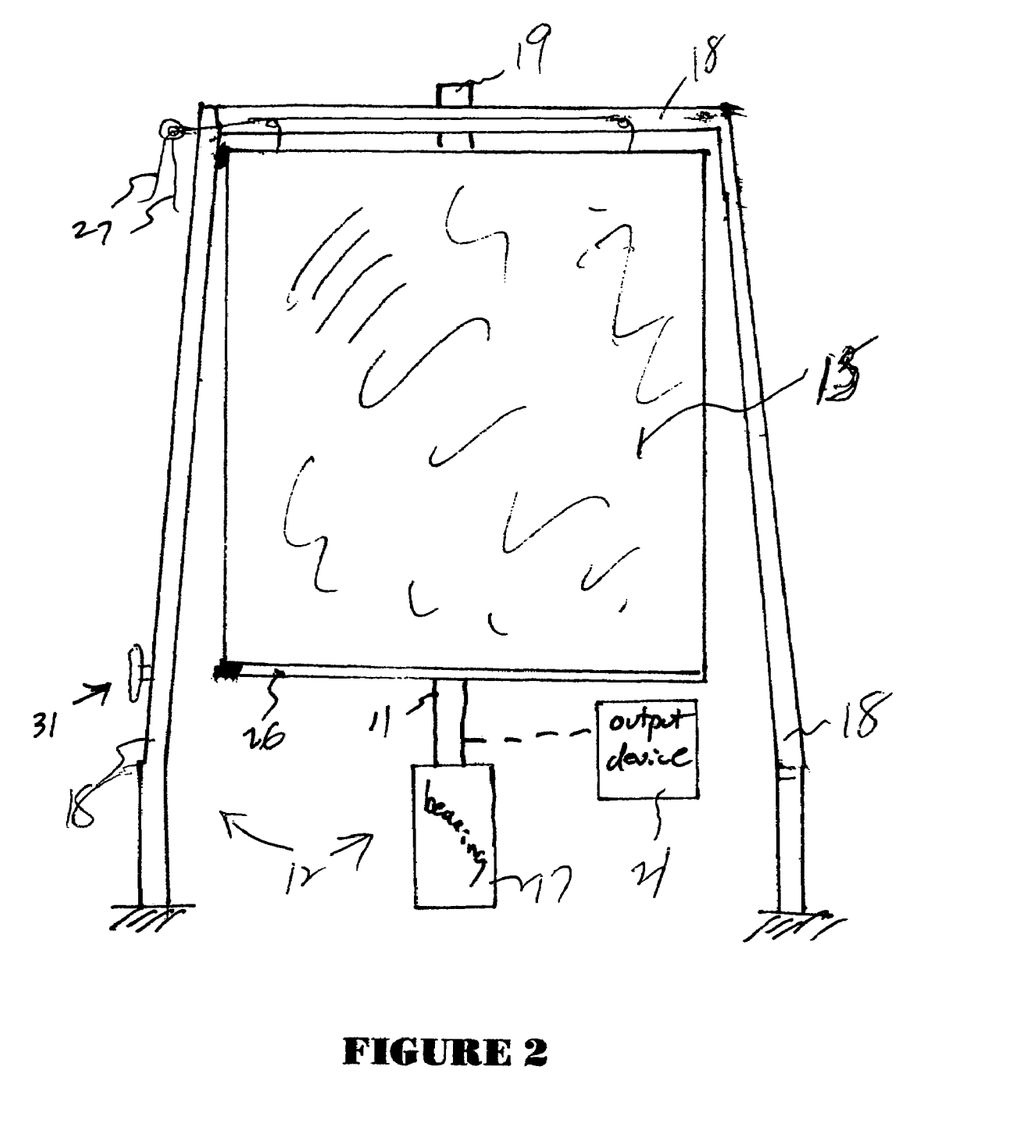

In the FIGS. 1 & 2 version, the structure 12 which mounts the shaft 11 includes a bottom bearing 17, and a stationary [with respect to the shaft 11] component 18 supporting a top portion 19 of the shaft 11. In this embodiment, the collapsible shroud 15 is operatively connected to the top portion of the stationary structure 18 and the shroud 15 does not rotate with the shaft 11. This embodiment is particularly well suited for land based VAWTs, such as for producing electricity, pumping water, or the like. As seen in FIGS. 1 & 2, the shaft 11 is shown operatively connected to an output device 21, such as a generator, pump, or the like, which is driven by rotation of the shaft 11.

In the FIGS. 3 & 4 version, the collapsible shroud 15 is operatively connected to the top portion 19 of the shaft 11, preferably above all of the elements 13, and rotates with the shaft 11. This embodiment may be used on land (and connected to a device 21 as illustrated in FIG. 1), but is particularly suited for mounting on a multihull watercraft, illustrated in FIGS. 3 & 4 as mounted to at least one hull 22 of a watercraft 23 such as disclosed in U.S. patent application Ser. No. 10/443,954 filed May 23, 2003.

While the VAWT assemblies 10 are shown with only a single shaft 11, multiple shafts (e.g. 111 in FIGS. 7 & 11)—such as shown in U.S. patent application Ser. Nos. 10/854,280 filed May 27, 2004—may be utilized instead.

The shroud 15 preferably comprises flexible material, such as cloth of any synthetic (e.g. nylon, or conventional modern sail cloth material) or natural (e.g. flax, hemp, or cotton) woven, non-woven, or tightly knit material, drapeable sheet material (e.g. thin MYLAR® or other plastic), laminates (e.g. of cloth and plastic, possibly including impervious layers of other materials such as thin films of metal), or any other material that has good to excellent drapability, is long-lasting in an outdoor environment, and can function to so change the aerodynamic characteristics of the elements 13—when deployed thereover [FIGS. 2 & 4]—so as to substantially preclude rotation of the shaft 11 thereby.

FIGS. 5 and 6 show in more detail exemplary components for moving the shroud 15 between collapsed and deployed positions.

As seen in FIGS. 1 & 5, the shroud 15 is preferably mounted at the top to a top open or spoked ring 25 of relatively rigid material such as a rigid plastic or aluminum, and mounted at the bottom to an open bottom ring 26 also preferably of relatively rigid material. The top ring 25 is rigidly mounted to the top portion of the support 18, such as by a plurality of studs 18' (FIG. 5).

Two or more strands 27 are connected at one end thereof, e.g. by rigid connection 28 (see FIG. 5), to the bottom ring 26 at spaced locations therealong. The strands 27 may be of any suitable material such as tough plastic (e.g. nylon) line, single or multi-component steel cable, hemp or synthetic material rope, or the like. The strands 29 pass over one or more rounded stationary surfaces or rollers 29 (FIG. 5) and then preferably over a roller or through an eye 30 mounted by the support 18 exterior of the shroud 15, and then down to a holding or clamping mechanism 31. As seen most clearly in FIG. 5, the mechanism 31 may be a conventional cleat, although any conventional clamp with movable portions, VELCRO fasteners, or other mechanism, may be provided as long as it is capable of holding the strands 27 in position until released. The strands 27 are shown in the held or clamped position in FIG. 1, and in the released position in FIG. 2.

FIGS. 3, 4, & 6 show another embodiment for holding the shroud 15 collapsed or releasing it. In this embodiment the open lower ring 26 is provided mounted to two or more strands 27, but at the top the shroud 15 is mounted to a disc or spooked ring 32 which is connected to the shaft 11 by any suitable mechanism for rotation therewith. The shaft 11 is hollow, and has a plurality of openings 33 through which the strands 27 pass, or may be accessed. Between the bottom ring 26 (when the shroud is deployed—FIG. 4) and the bearing 17 is an arm or disc 34 which has a readily released clamping mechanism 35 thereon. The free ends of the strands 27—which may have enlarged stops 27' (see FIG. 6) connected thereto—pass through the lowermost opening 33 in shaft 11 adjacent clamp 35, and are received by the clamp 35 to hold the shroud 15 in collapsed condition (FIG. 3).

The clamping mechanism may comprise any manually, automatically (e.g. in response to sensed high wind speed), or powered (e.g. solenoid), operated mechanism. In the one, exemplary (only), embodiment illustrated in FIG. 6, the clamp 35 has a movable lever 36, a stationary component 37 forming part of disc or arm 34 or rigidly mounted thereto, a pivot 38, a spiral biasing spring 39, and a catch 40. The spring 39 normally biases a free end of the lever 26 into clamping contact with the component 37 (FIG. 6), so that the strands 27 are securely clamped therebetween. However by simply once quickly pressing on the upper (as seen in FIG. 6) free end of the lever 36, it may be rotated about the pivot 38 into contact with the catch 40, so that the strands 27 are released (FIG. 4).

To recover the ends of the strands 27 to allow the strands 27 to be pulled to lift the shroud 15 and return it to its collapsed position (FIG. 3), the stops 27' may be dimensioned so that they do not pass through the opening 33 adjacent the clamp 35. or other openings 33 may be provided along the shaft 11 to allow the ends of strands 27 to be grasped.

Figure 7:
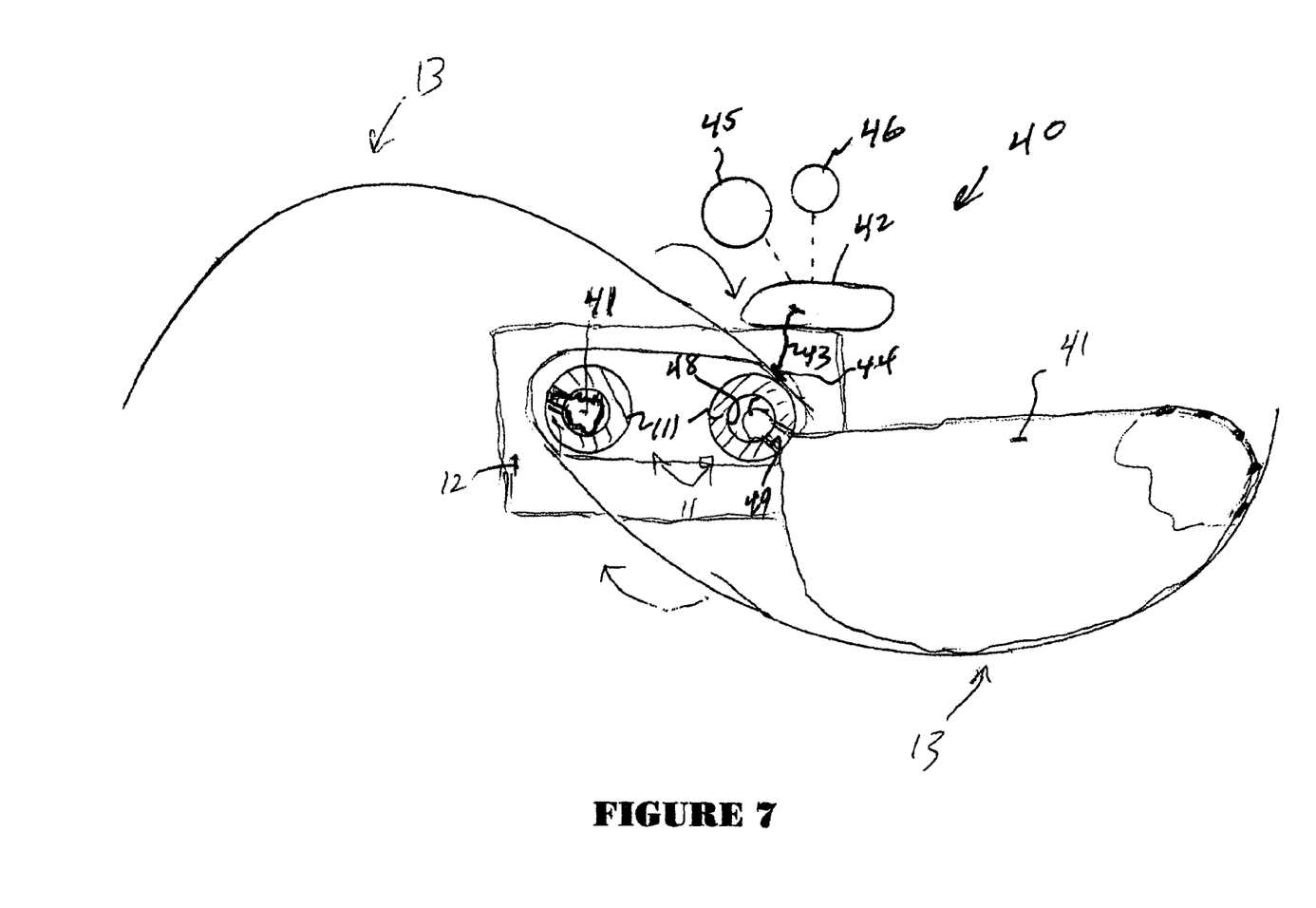
FIGS. 7 and 7A are top schematic views, respectively, of first and second versions of a second embodiment of the first aspect (shroud) of the invention, and FIG. 7A also schematically illustrates a third embodiment of this aspect.

FIG. 7 is a top schematic view which shows a second embodiment in which operation of the VAWT 40 [having multiple shafts 111—or a single shaft if desired—mounting structure 12, and wind-engaging elements 13 like the FIGS. 14 embodiments] is selectively allowed or prevented by collapsing or inflating one or more bladders 41, or the like, positioned to—when inflated—fill at least a significant portion of the wind-engaging area of the elements 13. A bladder 41 is shown inflated in the convex portion of the element 13 (a Savonius rotor in the embodiment illustrated) at the right of FIG. 7, while a bladder 41 is shown as deflated for the leftmost element 13 in FIG. 7. Normally both (or all) bladders 41 would be inflated or deflated at the same time, but only one bladder 41 need be provided in most circumstances since changing the aerodynamic characteristics of one element 13 will often change the characteristics of the entire VAWT 40 (e.g. substantially prevent rotation of shafts 111). When the bladder 41 is inflated (as seen at the right of FIG. 7), the elements 13 are substantially prevented from rotating the shafts 111.

The bladder 41 is preferably of any suitable elastomeric material (such as natural or synthetic rubber), or a collapsible and deployable laminate or the like. It may be inflated by a conventional compressed gas cylinder 42, such as provided for an automobile air bag, or an inflatable boat. The cylinder 42 may be operatively mounted to the shafts 111, but preferably (as seen in FIG. 7) is mounted on a support for the shafts 111 that does not rotate therewith (such as the structure 12 or hull 23 of the FIGS. 1-4 embodiments).

A fluid conduit 43 operatively connects the cylinder 42 to the bladder(s) 41. The conduit 43 may be passed through the hollow interior of s shaft 111 from the bottom or top thereof so that it does not interfere with rotation of the shaft, and/or any suitable conventional fluid-tight bearing arrangement— shown generally by reference numeral 44—may be provided to operatively connect the conduit 43 and bladder 41 while not hindering rotation of the shafts 111 or twisting of the conduit 43.

The cylinder(s) 42 may be activated manually, as by using the control shown schematically at 45 in FIG. 7, or automatically, e.g. in response to the anemometer 46 in FIG. 7. For instance, if it is desirable to prevent rotation of the shafts 111 and/or preclude wind acting on convex portions of the elements 13, when the wind speed reaches a certain level (e.g. over fifty mph) in order to protect the VAWT 40 and/or surrounding property or beings, once the anemometer 46 senses such a wind speed the cylinder 42 inflates the bladder(s) 41. Normally the bladder(s) 41 stay(s) inflated until the pressure in the bladders 41 is manually released, e.g. again with manual control 45, which can be moved to a position controlling a valve to let the compressed gas in bladders 41 vent to the atmosphere, or to a reservoir (not shown). A vacuum pump (not shown) may also be used to assist collapse of the bladder(s) 41 where necessary or desirable.

The bladders 41 can be redeployed in collapsed condition in cavities 48 either manually or automatically after collapse and when normal operation of the VAWT 40 is desired. The cavities 48 are shown in FIG. 7 as being the interiors of the shafts 11, but special exterior, recessed, or other types of cavities may be provided.

Figures 7A, 13:
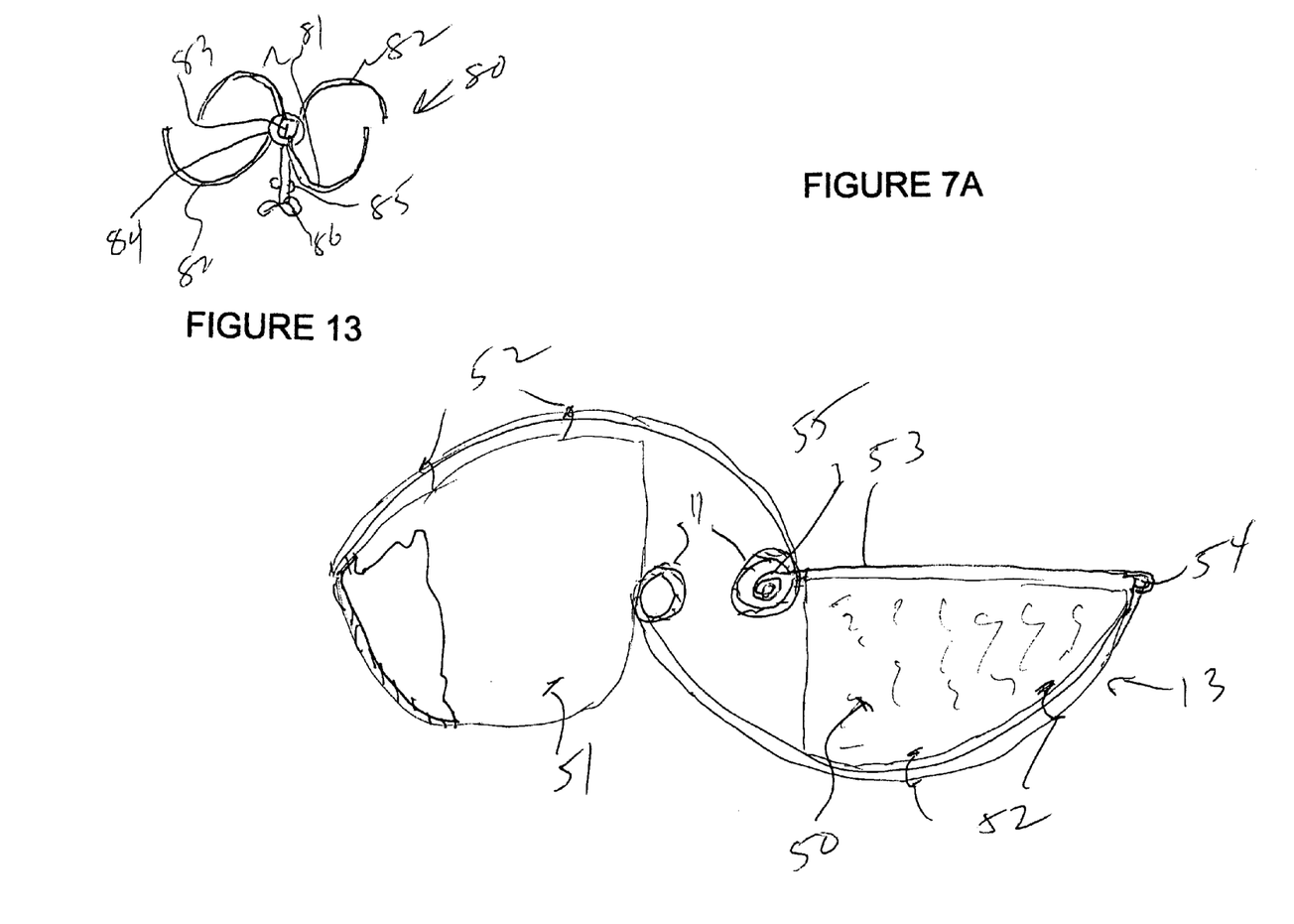
FIG. 13 is a schematic top plan view of the VAWT of FIG. 12.

The version of FIG. 7A is similar to the version of FIG. 7 except that instead of using inflatable bladders, one or more pre-defined shape inserts 50, 51 are provided for the wind engaging area of the VAWT 13. The inserts 50, 51 are simply lifted into place with respect to the wind engaging areas (e.g. convex portion or volume) of the VAWT 13, and held in place by any suitable device. For example the inserts 50 may be of Styrofoam, while inserts 51 are thin plastic wall hollow elements held in place by straps, strips of hook and loop (e.g. VELCRO®) fasteners, or hooks (shown schematically at 52 in FIG. 7A) on the inserts 50, 51 which hook to a spoke of the wind turbine 13. The hooks 52 are particularly suitable with spokes having a configuration of co-pending U.S. application Ser. No. 11/113,176 filed Apr. 25, 2005.

The third embodiment of shroud is also illustrated on the right of FIG. 7A and comprises a flexible sheet 53 which is spring biased to a rolled configuration (much like a conventional window shade, only on a substantially vertical axis instead of a horizontal one), but is moveable to the operative position illustrated in FIG. 7A covering the convex volume of the wind engaging elements 13. It may be latched in the operative position by any suitable latching device, such as the hooks 54 illustrated. The roll 55 for sheet 53 may be mounted within shaft 11 as seen in FIG. 7A, or may be mounted exteriorly of the shaft 11.

Figure 8:
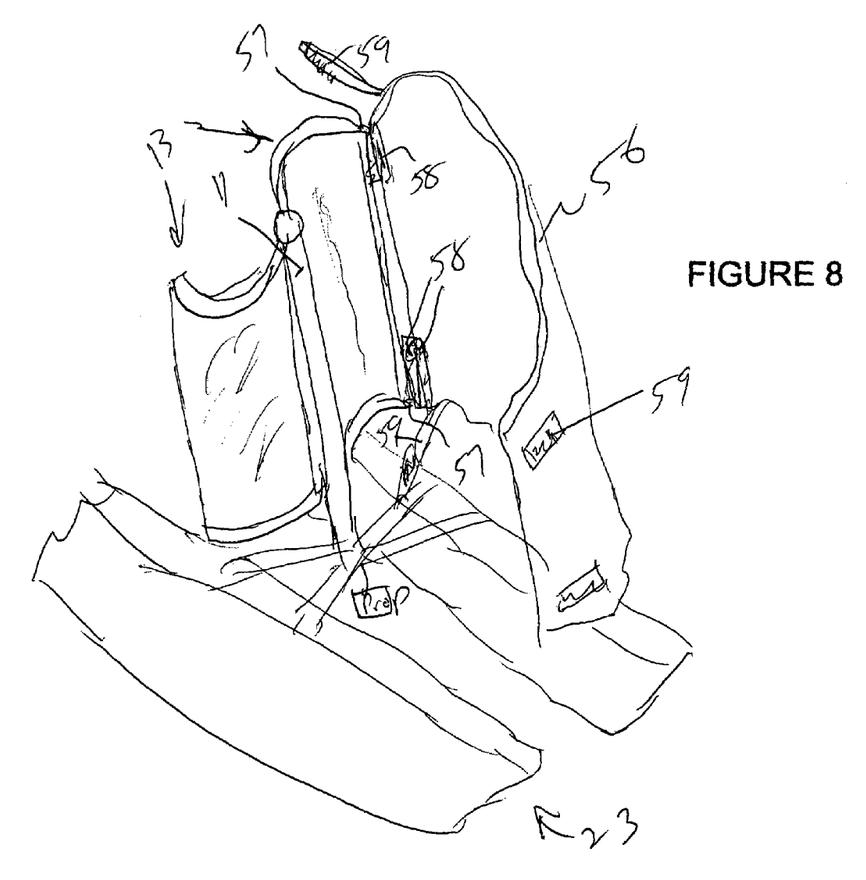
FIG. 8 is a schematic perspective view of a wrap-around embodiment of the first aspect (shroud) of the invention.

The fourth embodiment of the shroud is illustrated in FIG. 8, and comprises a wrap around embodiment of a shroud. It utilizes as the shroud a wrap-around flexible sheet 56, e.g. of cloth or plastic. Sheet 56 can be attached to or adjacent peripheral tip portions 57 of the wind engaging elements 13 (e.g. spokes and/or vanes of a Savonius turbine, for example), and when the turbine 13 rotates or is rotated, the sheet 56 wraps around the wind engaging elements 13 rendering them substantially inoperable, and the shroud is then fixed in place. Hoop and loop pile (e.g. VELCRO®) fasteners 58 may be utilized to attach the sheet 56 to the tips 57 of the wind engaging elements 13. Other hook and loop fasteners in the form of straps 59 and portions 59' may be used to attach one part (e.g. end) of the sheet 56 to another part (e.g. end) in the wrapped position. FIG. 7A shows the shroud and VAWT mounted on a catamaran 23.

According to a second aspect of the present invention, there is provided a variable pitch propeller that is suitable for the wind powered boat of the above applications, or other watercraft (such as manually powered craft) not necessarily powered by a high speed motor or engine. The variable pitch prop of U.S. Pat. No. 2,742,097 to Gaston (incorporated by reference herein) is close to acceptable but has some problems.

Figure 9:
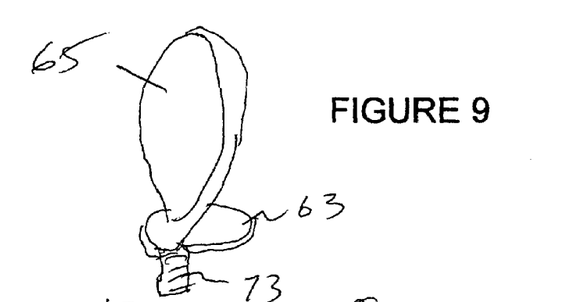
FIG. 9 is an isometric view of a blade per se of an exemplary adjustable pitch prop according to a second aspect of the present invention.
Figure 10:
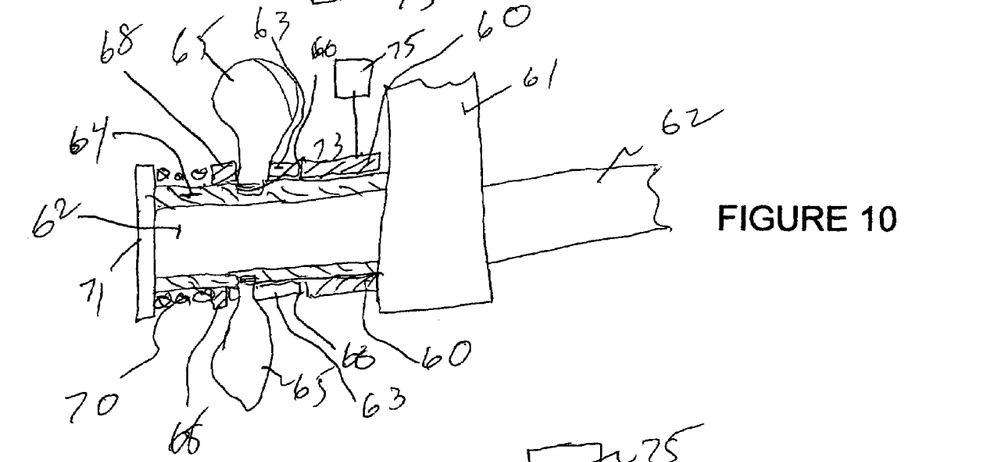
FIG. 10 is a side view, partly in cross section and partly in elevation, of a variable pitch propeller assembly using the prop blade of FIG. 9.
Figure 11:
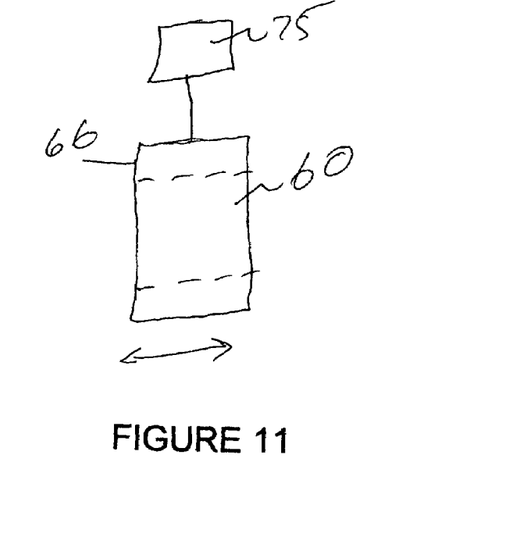
FIG. 11 is a front view of the actuating sleeve of the assembly of FIG. 10.

The invention of FIGS. 9-11 is only one representation of the broad concept of the invention of using a variable pitch prop with a wind powered boat (which may or may not have a manual assist) and/or human powered water craft. The exemplary embodiment of FIGS. 9-11 would eliminate the drag likely caused by the arm arrangement (30 in Gaston) of the patent which may be acceptable in a motor powered prop boat, but not in a wind powered or human powered craft. Also, the particular Bowden cable arrangement of Gaston may not be durable enough where it is located and an additional bearing (53 in Gaston) is required.

The invention is simpler and has less drag and more flexibility than the arrangement of Gaston. In the exemplary embodiment of FIGS. 9-11, the actuating sleeve 60 is preferably mounted right next to an already existing support 61 for the prop drive shaft 62, downstream of the support 61, and "hidden" (to the water) by it, so that the sleeve 60 doesn't cause any significant additional (to that provided by support 61) resistance to movement through the water. The sleeve 60 merely engages the extensions 63 of the propeller blades 65 rather than having pins extending through slots in the prop extensions (as in Gaston), so that the sleeve 60 need not rotate with the shaft 62, and preferably does not.

The hub 64 is preferably operatively connected to the shaft 62 for rotation therewith by a spline or key, shown schematically at 67 in FIG. 10. Preferably the interior of the sleeve 60 surrounding the shaft 62 and sliding on the hub 64, and the surface portion 66 of the sleeve 60 surrounding the prop extensions 63, are of low friction material, such as polytetrafluoroethylene, self-lubricating nylon, highly polished metal (such as aluminum), or the like. A ring 68 on the opposite side of the prop extensions 63 from the sleeve 60 is also of low friction material, and is biased (e.g. spring pressed, such as by the coil spring 70) into engagement with the prop extensions 63 so as to operatively bias the extensions 63 toward a desired initial position (and thus initial pitch). The ring 68 also need not (and preferably does not) rotate.

The spring 70 is shown between the ring 68 and a hub termination 71, but may be between ring 68 and another ring [not shown] which engages the termination 71. Instead of a coil spring any other suitable known biasing device 70 may be used, such as a piece of elastomeric material.

During use, the extensions 63 function as cams while sleeve 60 is a cam follower. Linear movement of sleeve 60 rotates blades 65 through engagement with cams 63.

The pivotal/rotatable connections 73 of the blades 65 to the hub 64 are preferably substantially the same as in the Gaston patent. The sleeve 60 may be moved by any suitable known or hereafter developed mechanical device, and is shown only schematically at 75. Suitable devices 75 include lever assemblies or systems, a Bowden cable assembly, cam and follower arrangements, a lever and cam arrangement, rotary movement to linear movement transforming elements, and/or rack and pinion devices, and/or any other conventional device by which a remote operator can transmit linear movement to the sleeve 60 to cause it to reciprocate. The mechanical device 75 is preferably detented or locked in any position to which it is moved—if the detent or lock is activated by the operator—to hold the pitch of blade 65 in a particular position (e.g. the blades 65 each at about a positive pitch of 30 degrees to the dimension of elongation of the drive shaft 62).

The pitch of propellers 65 may be adjusted so that it is positive or negative (causing reverse movement of the watercraft of which the drive shaft 62 is part, such as the watercraft of the above-identified patent applications), and, as one example, can be adjusted by the operator (even while the boat is moving) between about minus ten degrees pitch and plus forty five degrees pitch (and specifically all other narrow ranges within that broad range).

The adjustable pitch propeller according to the invention is mounted on a watercraft, such as of the applications incorporated by reference herein, in any conventional or hereafter developed manner.

The third aspect of the present invention relates to a VAWT of the Savonius, open helix type, or like VAWT which has a "hand", or required direction of rotation depending upon how constructed. It has been determined that when using such VAWTs on watercraft to drive propellers that sometimes wind from one side causes significantly better operation of the watercraft than wind of the same speed from the other side. This problem is addressed in a co-pending application of Vanderhye, Nunes and Lowe-Wylde entitled WIND POWERED BOAT filed on May 26, 2005 by providing two WAVTs of opposite hand, rotating propellers in opposite directions. The third aspect of the invention comprises another manner of addressing the problem.

Figure 12:
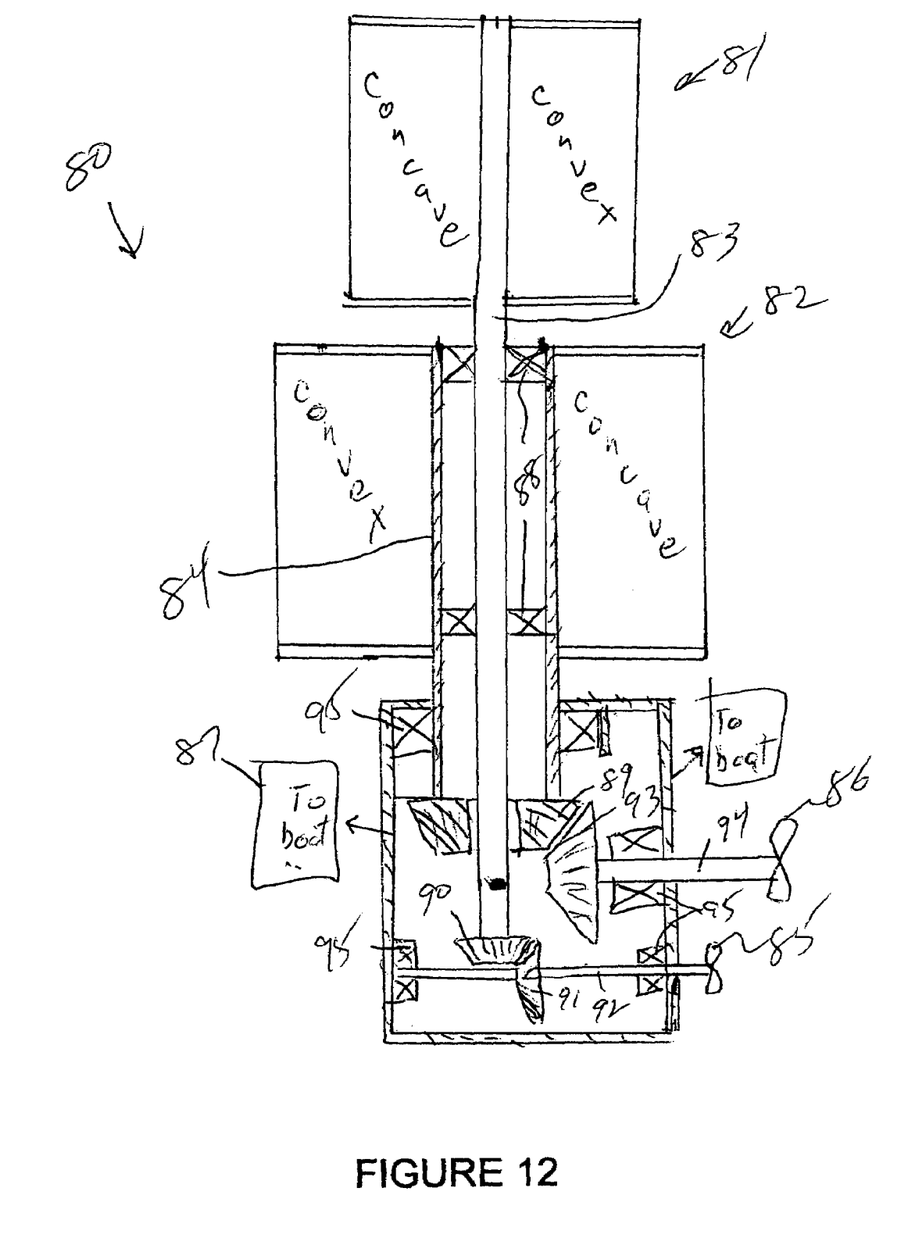
FIG. 12 is a side schematic view, partly in cross-section and partly in elevation, of a concentric shaft Savonius VAWT having rotor stages of diffeent hand, according to a third aspect of the present invention.

As seen in FIGS. 12 & 13—which illustrate a Savonius wind turbine 80 such as the type disclosed in co-pending U.S. application Ser. No. 11/113,176 filed Apr. 25, 2005—the VAWT 80 has at least two rotor stages 81, 82 designed to rotate in different directions (that is one clockwise, and the other counterclockwise). The rotor stages 81, 82 are mounted on concentric first and second shafts 83, 84, and operatively connected to driven devices, such as propellers or generators. Preferably the shafts 83, 84 are operatively connected to counter-rotating first and second propellers 85, 86; e.g. the first propeller 85 rotates clockwise, and the second 86 counterclockwise. The VAWT 80 is mounted on a watercraft, shown schematically at 87 in FIG. 12, with both propellers 85, 86 powering the craft 87 forward.

FIG. 13 provides a schematic top view of the VAWT 80. While the rotor stages 81, 82 are illustrated as having different diameters (because of different diameters of the shafts 83, 84), then may be constructed so that the same effective wind force is received and transmitted by each of the rotor stages 81, 82.

The exact mechanisms for operatively connecting the first shaft 83 to first propeller 85 and second shaft 84 to second propeller 86 may vary widely. In the exemplary (only) embodiment illustrated in FIG. 12, the shaft 83 is mounted by bearings 88 within hollow shaft 84, and passes through the interior passage of hollow bevel gear 89 and has bevel gear 90 at the end thereof remote from rotor stage 81. Gear 90 cooperates with gear 91 on the shaft 92 for first propeller 85. Gear 89 cooperates with bevel gear 93 connected to the shaft 94 for second propeller 86. Bearings 95 are provided wherever necessary.

Instead of the configuration of FIG. 12, the propellers and drives therefor may have a construction similar to counter-rotating props on many conventional power boats, such as shown in U.S. Pat. Nos. 5,800,223 and 5,890,938, only with two drive shafts.

While in most embodiments of the drawings Savonius rotors are illustrated with two vanes connected to a shaft for simplicity of illustration, three vane and four vane embodiments are equally utilizable.

The invention also relates to methods of making, constructing, or using, any of the structures or assemblies described above.

The invention is to be accorded the broadest interpretation possible, limited only by the prior art, so as to encompass all equivalents to what is set forth in the following claims. All numerical values are approximate, and all narrow ranges within a broad range are specifically included herein.

The invention claimed is:

1. A vertical axis wind turbine assembly comprising:
   a shaft;
   a structure which mounts said shaft for rotation about a substantially vertical axis;
   a plurality of wind engaging elements operatively mounted to the shaft which operatively engage wind and rotate said shaft in response thereto; and
   a shroud which collapses over the wind engaging elements, is inserted among the wind engaging elements, or flexibly wraps around the wind engaging elements, so that when utilized substantially retards or prevents rotation of said shaft about its axis.

2. A vertical axis wind turbine assembly as recited in claim 1 wherein said shroud comprises a collapsible shroud operatively mounted above at least some of said wind engaging elements and positioned so that, when in a collapsed position, substantially does not interfere with wind acting upon said wind engaging elements, or rotation of said shaft, but when moved from the collapsed position to a deployed position substantially blocks wind access to at least some of said wind engaging elements so as to substantially retard or prevent rotation of said shaft.

3. An assembly as recited in claim 2 wherein said structure which mounts said shaft includes a stationary, with respect to said shaft, component mounted adjacent a top portion of said shaft, and wherein said collapsible shroud is operatively connected to said stationary top structure and said shroud does not rotate with said shaft.

4. An assembly as recited in claim 2 wherein said collapsible shroud is operatively connected to, and rotates with, said shaft.

5. An assembly as recited in claim 2 wherein said shroud when in a deployed position substantially blocks wind access to all of said wind engaging elements.

6. An assembly as recited in claim 1 wherein said wind engaging elements comprise a plurality of substantially convex volumes; and wherein said shroud comprises at least one insert which substantially blocks wind access to at least one substantially convex portion of a wind engaging element so as to substantially retard or prevent rotation of said shaft.

7. An assembly as recited in claim 6 wherein said insert has a substantially pre-defined shape and is held in place in a convex volume of a wind, engaging element.

8. An assembly as recited in claim 6 wherein said insert comprises at least one collapsible or deployable bladder operatively mounted adjacent at least some of the wind engaging elements and positioned so that, when in a collapsed position, substantially does not interfere with wind acting upon the wind engaging elements, or rotation of the shall, but when moved from the collapsed position to a deployed position substantially blacks wind access to at least one substantially convex volume of a wind engaging element so as to substantially retard or prevent rotation of said shaft.

9. An assembly as recited in claim 8 wherein said bladder is connected to a source of compressed gas which can inflate the bladder to deploy it.

10. An assembly as recited in claim 9 wherein said source of compressed gas is manually activated.

11. An assembly as recited in claim 9 wherein said source of compressed gas is automatically activated in response to a pre-determined wind speed.

12. An assembly as recited in claim 1 wherein said shroud comprises a flexible sheet of material which is operatively connected to one peripheral portion of said wind turbine, and wraps around said wind turbine and is held in place in said wrapped position.

13. An assembly as recited in claim 12 wherein said flexible sheet of material is held in place in said wrapped position by cooperating hook and loop fasteners.

14. An assembly as recited in claim 1 wherein said shaft, shaft mounting structure, and wind engaging elements are mounted on a watercraft, and wherein the watercraft includes a variable pitch propeller assembly, operable by an operator positioned in or on the watercraft.

15. An assembly as recited in claim 14 wherein the propeller variable pitch is controlled by one or more cams operatively connected to propeller blades, and a reciprocal sleeve operatively engaging the cams.

16. An assembly as recited in claim 14 wherein the variable pitch propeller assembly comprises: a central drive shaft surrounded by a hub; a sleeve reciprocal on the hub; a plurality of blades each rotatably connected to the hub and having a cam; and a device which operatively biases the cams into contact with the sleeve so that reciprocation of the sleeve effects rotation of the blades with respect to the hub to change the pitch thereof.

17. An assembly as recited in claim 1 having at least first and second rotor stages of spokes and vanes having different hands, and constructed and positioned to rotate in different directions; and wherein said shaft comprises a first shaft, substantially concentric with a second shaft, said shafts operatively connected to said rotor stages and rotatable therewith in response to wind; and first and second driven devices operatively connected to said shafts and driven separately by said shafts.

18. An assembly as recited in claim 17 wherein the driven devices are first and second propellers operatively mounted for rotation in opposite directions, and wherein said wind turbine is mounted on a watercraft so that rotation of said first and second propellers powers said watercraft forward.

19. A vertical axis wind turbine assembly comprising:
a shaft;
a structure which mounts said shaft for rotation about a substantially vertical axis;
a plurality of wind engaging elements operatively mounted to the shaft which operatively engage wind and rotate said shaft in response thereto, wherein said wind engaging elements comprise a plurality of substantially convex volumes; and
a shroud which pulls over at least one of the wind engaging elements, so that when utilized substantially retards or prevents rotation of said shaft about its axis, wherein said shroud comprises at least one rolled sheet positioned to be pulled over at least one convex volume and held in place covering the volume.

20. An assembly as recited in claim 19 wherein said shroud comprises a rolled sheet positioned to be pulled over each convex volume and held in place covering a respective volume.

* * * * *